Patented July 6, 1937

2,086,473

UNITED STATES PATENT OFFICE 2,086,473

METHOD OF SEPARATING UNSATURATED AND SATURATED ALIPHATIC HYDROCARBONS

Morris S. Nafash, Union City, N. J., assignor to Cesare Barbieri, New York, N. Y.

No Drawing. Application May 3, 1934, Serial No. 723,701. Renewed November 17, 1936

19 Claims. (Cl. 260—162)

The present invention relates to a method of separating unsaturated aliphatic hydrocarbon gases from saturated aliphatic hydrocarbon gases, especially from gases produced in petroleum and similar cracking procedures.

It is well known that heretofore various methods have been used to separate unsaturated hydrocarbons from saturated hydrocarbon gases. The more important procedure was the liquefaction procedure involving the use of high pressures and low temperatures to liquefy certain of the constituents of the gas mixture and removing them therefrom. One of the outstanding procedures of this type was the so-called Linde process. As is well known, this procedure has many disadvantages of which may be mentioned the high initial investment required for an installation capable of separating unsaturated hydrocarbons from saturated hydrocarbon gases on an industrial scale. Moreover, the necessity for using high pressures and low temperatures requires the expenditure of large amounts of energy and involves high operating costs and high maintenance expenses. Various methods were proposed to replace the liquefaction process. Of these proposals, the sulphuric acid method may be mentioned. In this method sulphuric acid is used to react chemically with the unsaturated hydrocarbons. In practice, complicated side reactions occurred as well as polymerization. Due to the complications of the process and the corrosive nature of sulphuric acid and the inefficient yields and recoveries, the sulphuric acid process has not been able to replace the so-called Linde liquefaction process which is the most important industrial procedure. Although various procedures have been made to replace the prior art procedures, none as far as I am aware, has been provided which is wholly satisfactory and acceptable in industrial practice.

I have discovered a procedure which overcomes the disadvantages of the prior art and which is very simple to carry into practice.

It is an object of the invention to provide an improved method of separating unsaturated aliphatic hydrocarbons from saturated aliphatic hydrocarbon gases which can be carried into practice industrially at substantially normal pressures and temperatures.

It is also within the contemplation of the invention to provide a method of separating unsaturated aliphatic hydrocarbons from saturated aliphatic hydrocarbon gases in a simple apparatus.

It is a further object of the invention to provide a method which is economical, which is commercial and which can be carried into practice on an industrial scale.

Other objects and advantages of the invention will become apparent from the following description of a preferred procedure.

In carrying the method into practice a strong aqueous solution of a soluble bromide is prepared which will release its bromine upon the introduction of chlorine gas. By continuing the introduction of chlorine the liberated bromine enters the solution in amounts exceeding its normal solubility.

After the foregoing solution has been prepared containing bromine in a soluble form which appears to have nascent characteristics, the gas containing saturated hydrocarbons and unsaturated hydrocarbons is brought into contact with the solution. This is effected by passing the gas, preferably in the form of very fine bubbles, through the solution. It has been found that satisfactory results are obtained if the gas is passed through a porous material such as a porous refractory thimble or a porous earthenware plate, diaphragm, cylinder or the like. In passing through the solution practically all of the unsaturated hydrocarbons are removed and the gas which is evolved may be practically wholly saturated hydrocarbons.

For the purpose of giving those skilled in the art a better understanding of the invention the following illustrative example will be given.

A strong aqueous solution of sodium bromide is prepared and chlorine gas is introduced until bromine is liberated and is converted into a soluble form. Gases from an oil cracking still are passed through the solution. A porous thimble may be used and is located at the bottom of a tall cylinder containing the solution. The gas passes through the column of liquid and is then introduced into a second cylinder. When the gas is evolved from the second cylinder essentially a large proportion of the unsaturated hydrocarbons is removed. Ordinarily, various pressures may be employed but it has been found that the foregoing procedure may be carried out satisfactorily at a gas pressure lower than about 25 pounds per square inch.

The following table gives the analysis of a gas mixture before and after being subjected to the present method:

Table

| Component | Analysis of cracked gas | Analysis of treated gas |
| --- | --- | --- |
|  | Percent | Percent |
| Unsaturates | 32.65 | Nil |
| Carbon dioxide | 0.20 | Nil |
| Air | Nil | Nil |
| Methane and lighter | 44.70 | 75.01 |
| Ethane | 17.25 | 21.36 |
| Propane | 3.87 | 2.75 |
| Butanes | 1.04 | 0.27 |
| Pentane and heavier | 0.28 | 0.61 |
| Total | 100.00 | 100.00 |

When gases are treated, such as gases containing aliphatic unsaturated and saturated hydrocarbons obtained from the cracking of petroleum and the like, the unsaturated gases contain large percentages of ethylene and propylene. Under these conditions, brom-hydrocarbons or bromchlor hydrocarbons are produced. For instance, if gases from a "Gyro" cracking still are used, large amounts of the aforesaid hydrocarbons may be produced and particularly ethylene dibromide or ethylene bromchloride. Similar propylene dibromide or propylene bromchloride or the like may be produced.

It is to be observed that the present invention provides a process of producing brom-hydrocarbons or bromchlor hydrocarbons. For instance, the introduction of chlorine at normal atmospheric temperatures (about 5° C. to about 20° C.) into a solution containing bromide, such as sodium bromide and the like, is continued until such an amount of bromine is liberated that bromine chloride is formed in the salt solution. Gases containing unsaturated hydrocarbons such as ethylene, may then be passed or bubbled through the solution containing bromine chloride and ethylene bromchloride will be formed. In this manner, ethylene bromchloride or similar compounds may be formed easily and cheaply.

It is to be observed that the present invention provides a process which involves the discovery that enormous volumes of bromine in excess of its normal solubility may be contained in a solution of a bromide, especially a concentrated or saturated salt solution of sodium bromide and sodium chloride. With a solution of this sort, it is very practical to treat large volumes of gases containing unsaturated hydrocarbons including ethylene, propylene, etc. If several bromchlorides are formed, such as ethylene bromchloride, propylene bromchloride, etc., they may be separated very easily by distillation.

Although a preferred embodiment has been described, it is to be understood that variations and modifications may be resorted to as those skilled in the art will readily understand and that such variations and modifications are within the purview of the appended claims. Thus, it is possible to produce bromides and/or bromchlorides, and/or, mixtures of bromides and bromchlorides or mixtures of bromides and chlorides and/or bromchlorides. As the chlorine bubbles into the solution containing a soluble bromide (e. g. sodium bromide, potassium bromide, calcium bromide, or other bromide of the alkali family and/or alkaline earth family, etc.) bromine is liberated and settles to the bottom of the vessel to form a bromine layer. By continuing the bubbling or flowing of chlorine through the solution, the bromine layer disappears and goes into the aqueous layer. The exact nature and mechanism of this chemical reaction is not fully known, but it is believed that bromine chloride is formed which is soluble in the aqueous solution containing a halide (e. g. sodium bromide and/or sodium chloride). One skilled in the art will thus appreciate that various halogenated hydrocarbons or mixtures thereof may be produced by passing unsaturated hydrocarbons, particularly those of aliphatic character, through the solution in various conditions (e. g. through a solution containing bromine and/or bromine chloride and/or chlorine).

I claim:—

1. The method of separating unsaturated hydrocarbon gases from saturated hydrocarbon gases which comprises contacting a mixture of said gases with a concentrated aqueous solution containing sodium chloride and containing bromine and chlorine in amounts exceeding their normal solubility whereby the unsaturated hydrocarbon gases are substantially separated from the saturated hydrocarbon gases.

2. The method of separating unsaturated aliphatic hydrocarbon gases from saturated aliphatic hydrocarbon gases which comprises contacting a mixture of said gases with a saturated aqueous solution containing sodium chloride and containing bromine and chlorine in amounts exceeding their normal solubility whereby the unsaturated hydrocarbon gases are substantially separated from the saturated hydrocarbon gases.

3. The method of separating unsaturated hydrocarbon gases from saturated hydrocarbon gases which comprises contacting a mixture of said gases with a saturated aqueous solution of sodium chloride containing bromine in the presence of free chlorine in amounts exceeding their normal solubility in said saturated salt solution whereby the unsaturated hydrocarbon gases are substantially separated from the saturated hydrocarbon gases.

4. The method of separating unsaturated hydrocarbon gases from saturated hydrocarbon gases which comprises contacting a mixture of said gases with a saturated aqueous solution of sodium chloride containing bromine and chlorine in amounts exceeding their normal solubility in their saturated salt solutions whereby the unsaturated hydrocarbon gases are substantially separated from the saturated hydrocarbon gases.

5. The method of separating unsaturated hydrocarbon gases from saturated hydrocarbon gases which comprises contacting at normal temperature and pressure a mixture of said gases with a concentrated aqueous solution containing sodium chloride and containing bromine and chlorine in amounts exceeding their normal solubility whereby the unsaturated hydrocarbon gases are substantially separated from the saturated hydrocarbon gases.

6. The method of separating unsaturated hydrocarbon gases from saturated hydrocarbon gases which comprises contacting at normal temperature and at pressure below about 25 lbs. per sq. in. a mixture of said gases with a concentrated aqueous solution containing sodium chloride and containing bromine and chlorine in amounts exceeding their normal solubility whereby the unsaturated hydrocarbon gases are substantially separated from the saturated hydrocarbon gases.

7. The process of separating unsaturated hydrocarbon gases from saturated hydrocarbon gases which comprises bringing chlorine gas into contact with a concentrated aqueous solution of a soluble bromide to form sodium chloride and to liberate bromine, continuing said treatment with chlorine to cause the liberated bromine to form bromine chloride and to go in the solution, introducing a mixture of mixed unsaturated and saturated hydrocarbon into said solution whereby the unsaturated gases are substantially separated from saturated hydrocarbons which are evolved substantially free from unsaturated hydrocarbons.

8. The process of separating unsaturated hydrocarbon gases from saturated hydrocarbon gases which comprises bringing chlorine gas into contact with a saturated aqueous solution of a soluble bromide to form sodium chloride and to liberate bromine, continuing said treatment with chlorine to cause the liberated bromine to form bromine chloride and to go in solution, introducing a mixture of unsaturated and saturated hydrocarbon gases at normal temperature and pressure below 25 lbs. per square inch whereby the unsaturated gases are substantially separated from saturated hydrocarbons which are evolved substantially free from unsaturated hydrocarbons.

9. The process of separating unsaturated hydrocarbon gases from saturated hydrocarbon gases which comprises bringing chlorine gas into contact with a concentrated aqueous solution of a soluble bromide to form sodium chloride and to liberate bromine, continuing said treatment with chlorine to cause the liberated bromine to form bromine chloride and to go in the solution, bubbling a mixture of unsaturated and saturated hydrocarbon gases in a dispersed state into said solution whereby the unsaturated gases are substantially separated from saturated hydrocarbons which are evolved substantially free from unsaturated hydrocarbon.

10. The method of separating aliphatic unsaturated hydrocarbon gases from aliphatic saturated hydrocarbon gases which comprises introducing chlorine into a concentrated solution containing a soluble bromide to liberate bromine and to form bromine chloride, and passing gases containing unsaturated and saturated hydrocarbons through said solution containing bromine chloride whereby substantially all of the unsaturated hydrocarbon gases are removed.

11. The method of separating aliphatic unsaturated hydrocarbon gases from aliphatic saturated hydrocarbon gases which comprises introducing chlorine into a concentrated solution containing a soluble bromide to liberate bromine, continuing the introduction of chlorine until the liberated bromide forms bromine chloride and enters the solution in amounts exceeding its normal solubility, and passing gases containing unsaturated and saturated hydrocarbons through said solution containing bromine whereby substantially all of the unsaturated hydrocarbon gases are removed.

12. The method of separating aliphatic unsaturated hydrocarbon gases including ethylene from aliphatic saturated hydrocarbon gases which comprises introducing chlorine into a concentrated solution containing a soluble bromide to liberate bromine and to form bromine chloride, and passing gases containing unsaturated and saturated hydrocarbons including ethylene through said solution containing bromine chloride whereby substantially all of the unsaturated hydrocarbon gases are removed and whereby an ethylene bromide compound is produced.

13. The method of separating aliphatic unsaturated hydrocarbon gases including propylene from aliphatic saturated hydrocarbon gases which comprises introducing chlorine into a concentrated solution containing a soluble bromide to liberate bromine, and passing gases containing unsaturated and saturated hydrocarbons including propylene through said solution containing bromine chloride whereby substantially all of the unsaturated hydrocarbon gases are removed and whereby a propylene bromide compound is produced.

14. The method of separating aliphatic unsaturated hydrocarbon gases from aliphatic saturated hydrocarbon gases which comprises introducing chlorine into a concentrated solution containing a soluble bromide to liberate bromine and to form bromine chloride, and passing gases containing unsaturated and saturated hydrocarbons through a porous diaphragm into said solution containing bromine chloride whereby substantially all of the unsaturated hydrocarbon gases are removed.

15. The method of producing a bromchlor hydrocarbon which comprises introducing chlorine into a concentrated solution containing sodium bromide until the liberated bromine enters the solution and forms bromine chloride, and passing a gas containing an unsaturated hydrocarbon through said solution containing bromine chloride whereby a bromchlor hydrocarbon is produced.

16. The method of producing ethylene bromchloride which comprises introducing chlorine into a concentrated solution containing sodium bromide to liberate bromine and to form bromine chloride, and passing a gas containing ethylene through said solution containing said bromine chloride whereby ethylene bromchloride is formed.

17. The method of producing ethylene bromchloride which comprises introducing chlorine into a concentrated solution containing sodium bromide to liberate bromine and to form bromine chloride, and passing a gas containing ethylene through a porous diaphragm into said solution containing said bromine chloride whereby ethylene bromchloride is formed.

18. The method of producing a bromchlor hydrocarbon which comprises introducing chlorine into a concentrated solution containing sodium bromide until the liberated bromine enters the solution in amounts exceeding its normal solubility in said solution and forms bromine chloride, and passing a gas containing an unsaturated hydrocarbon through said solution containing bromine chloride whereby a bromchlor hydrocarbon is produced.

19. The method of producing propylene bromchloride which comprises introducing chlorine into a concentrated solution containing sodium bromide to liberate bromine and to form bromine chloride, and passing a gas containing propylene through said solution containing said bromine chloride whereby propylene bromchloride is formed.

MORRIS S. NAFASH.